United States Patent
Haywood

(10) Patent No.: US 8,880,790 B2
(45) Date of Patent: Nov. 4, 2014

(54) METHODS AND APPARATUS FOR TRANSFERRING DATA BETWEEN MEMORY MODULES

(75) Inventor: Christopher Haywood, Thousand Oaks, CA (US)

(73) Assignee: Inphi Corporation, Santa Clara, CA (US)

(*) Notice: Subject to any disclaimer, the term of this patent is extended or adjusted under 35 U.S.C. 154(b) by 159 days.

(21) Appl. No.: 13/619,692

(22) Filed: Sep. 14, 2012

(65) Prior Publication Data

US 2013/0073802 A1 Mar. 21, 2013

Related U.S. Application Data

(63) Continuation-in-part of application No. 13/359,877, filed on Jan. 27, 2012, now Pat. No. 8,694,721.

(60) Provisional application No. 61/691,736, filed on Aug. 21, 2012, provisional application No. 61/473,889, filed on Apr. 11, 2011.

(51) Int. Cl.
*G06F 13/40* (2006.01)
*G06F 13/00* (2006.01)
*G06F 13/36* (2006.01)
*G06F 13/28* (2006.01)
*G06F 3/00* (2006.01)

(52) U.S. Cl.
CPC ............... *G06F 13/40* (2013.01); *G06F 13/00* (2013.01); *G06F 13/36* (2013.01); *G06F 3/00* (2013.01); *G06F 13/28* (2013.01)
USPC .......................................... 711/104; 711/154

(58) Field of Classification Search
CPC ............ G06F 13/4243; G06F 13/4022; G06F 13/4282; G06F 2212/261; G06F 2212/312; G06F 3/0689; G06F 12/00; G06F 12/0215; G06F 13/1626; G06F 13/1657; G06F 13/1684; G06F 13/1694; G06F 13/161; G06F 13/1673; G06F 13/387; G06F 13/40; G06F 13/4072; G06F 17/5045; G06F 1/185; G06F 2212/205; G06F 2212/7208; G06F 3/00; G11C 7/1006; G11C 5/06
USPC .................................................. 711/104, 154
See application file for complete search history.

(56) References Cited

U.S. PATENT DOCUMENTS 5,592,612 A 1/1997 Birk
6,993,701 B2 1/2006 Corbett et al.
(Continued)

OTHER PUBLICATIONS

Office Action for U.S. Appl. No. 13/653,373, dated Mar. 27, 2014.
(Continued)

*Primary Examiner* — Hashem Farrokh
(74) *Attorney, Agent, or Firm* — Richard T. Ogawa; Ogawa P.C.

(57) ABSTRACT

A computer-implemented method for transferring data from a computer system programmed to perform the method includes receiving in a memory buffer in a first memory module hosted by the computer system, a request for data stored in RAM of the first memory module from a host controller of the computer system, retrieving with the memory buffer, the data from the RAM, in response to the request, formatting with the memory buffer, the data from the RAM into formatted data in response to a defined software transport protocol, and initiating with the memory buffer, transfer of the formatted data to a storage destination external to the first memory module via an auxiliary interface of the memory buffer, bypassing the host controller of the computer system.

17 Claims, 6 Drawing Sheets

(56) References Cited

U.S. PATENT DOCUMENTS

| | | |
|---|---|---|
| 7,990,746 B2 | 8/2011 | Rajan |
| 8,325,554 B2 | 12/2012 | Sweere et al. |
| 2004/0123029 A1 | 6/2004 | Dalal et al. |
| 2006/0200697 A1 | 9/2006 | Ito |
| 2008/0104290 A1* | 5/2008 | Cowell et al. .................. 710/71 |
| 2008/0183959 A1* | 7/2008 | Pelley et al. .................. 711/109 |
| 2009/0300259 A1* | 12/2009 | Luo et al. ..................... 710/313 |
| 2010/0005212 A1* | 1/2010 | Gower et al. ................. 710/308 |
| 2010/0162037 A1* | 6/2010 | Maule et al. ..................... 714/5 |
| 2010/0199125 A1 | 8/2010 | Reche |
| 2013/0060996 A1 | 3/2013 | Berke |

OTHER PUBLICATIONS

Notice of Allowance for U.S. Appl. No. 13/558,332, dated Feb. 25, 2014.

Office Action for U.S. Appl. No. 13/620,288, dated Oct. 1, 2013.

* cited by examiner

METHODS AND APPARATUS FOR TRANSFERRING DATA BETWEEN MEMORY MODULES

CROSS-REFERENCE TO RELATED APPLICATIONS

The present invention is a non-provisional of Application No. 61/619,736 filed Aug. 21, 2012 and claims priority to and is a continuation-in-part of application Ser. No. 13/359,877 filed Jan. 27, 2012 that claims priority to Application No. 61/473,889 filed Apr. 11, 2011. These applications are hereinby incorporated by reference, for all purposes.

BACKGROUND

The present invention relates generally to memory systems, and more particularly to computer systems which include memories systems with auxiliary interfaces.

Traditional computer systems, such as servers, workstations, desktops and laptops, all use pluggable memory which can be inserted into slots on the computer's motherboard as needed. The most common form of pluggable memory is the Dual In-line Memory Module (DIMM). Historically, DIMMs contain multiple RAM chips—typically DRAM—each of which has a data bus width of 4 or 8 bits. Typically, eight or nine 8-bit DRAM chips (or twice as many 4-bit DRAM chips) are arranged in parallel to provide each DIMM with a total data bus width of 64 or 72 bits; the data bus, typically referred to as the 'DQ' bus, is connected to a host controller. Each arrangement of 64 or 72 data bits using DRAM chips in parallel is termed a 'rank'.

A command/address (CA) bus also runs between the host controller and each DIMM; the CA and DQ busses together form a 'system' bus. With a basic unbuffered DIMM, the CA bus is connected to every DRAM on the DIMM. As a result, there is a high electrical load on the CA bus, given by the product of the number of DRAMs times the number of ranks. For the DQ bus, the number of electrical loads is equal to the number of ranks.

A buffering device is employed to reduce loading in a 'load reduction' DIMM (LR-DIMM), an example of which is illustrated in FIG. 1. An LR-DIMM 10 containing multiple DRAM chips 12 uses a logic device 14 to buffer the DQ and CA signals between the DRAMs and a host controller 16. Logic device 14 may be, for example, a single device such as the iMB (isolating Memory Buffer) from Inphi Corporation. Memory systems of this sort are described, for example, in co-pending U.S. patent application Ser. Nos. 12/267,355 and 12/563,308, which are incorporated herein by reference, for all purposes.

SUMMARY

The present invention is directed to memory systems which include a memory buffer having one or more auxiliary interfaces. In various embodiments, the auxiliary interfaces enable memory systems to send and receive data to and from other memory systems having such auxiliary interfaces and using a defined data protocol. Additionally, various embodiments enable separate computer systems having such memory systems to send and receive data to and from other memory systems having such auxiliary interfaces.

Embodiments of the present invention include a memory buffer having an interface arranged to buffer data and/or command bytes being written to or read from a plurality of RAM chips (typically DRAM) residing on a DIMM by a host controller (of a computer system). The memory buffer includes at least one additional interface arranged to buffer data and/or command bytes between the host controller (of the computer system) or RAM chips and one or more external devices (e.g. DIMM, remote computer system) coupled to the at least one additional (e.g. auxiliary) interface.

In one embodiment, the memory buffer may include a SATA interface and be arranged to convey data between the host controller or RAM chips and FLASH memory devices coupled to the SATA interface. Other types of interfaces may include, for example, an Ethernet interface, an optical interface, a radio interface, or the like. In various embodiments, the memory buffer may reside on the DIMM along with the RAM chips with which it interfaces, or be separate from the DIMM (e.g. on a motherboard, a daughter card, or the like).

In various embodiments, the memory buffer is provided with a predefined protocol to which data is transported out on the auxiliary interface and/or received into the auxiliary interface. In some embodiments, the protocol includes framing protocols, interframe signals, start of frame delimiters, error detecting protocols, CRC protocols, and the like. In other embodiments, many other types of protocols including protocol framing, error correction, or the like may also be used to format data outbound from an auxiliary interface or deformat data inbound from the auxiliary interface.

According to one aspect of the invention, a computer-implemented method for transferring data from a computer system programmed to perform the method is described. One method includes receiving in a memory buffer in a first memory module hosted by the computer system, a request for data stored in RAM of the first memory module from a host controller of the computer system, and retrieving with the memory buffer, the data from the RAM, in response to the request. A process includes formatting with the memory buffer, the data from the RAM into formatted data in response to a defined software transport protocol, and initiating with the memory buffer, transfer of the formatted data to a storage destination external to the first memory module via an auxiliary interface of the memory buffer, bypassing the host controller of the computer system.

According to another aspect of the invention, a computer system configured to transferring data to a remote computer system is described. One apparatus includes a host controller configured to output instructions, and a processor coupled to the host controller, wherein the processor is configured to provide the instructions to the host controller. A device includes a memory module coupled to the host controller, wherein the memory module including RAM configured to store and provide data, a memory buffer coupled to the RAM and to the host controller, wherein the memory buffer is configured to receive the instructions from the host controller, wherein the memory buffer is configured to retrieve the data from in the RAM in response to the instructions, and wherein the memory buffer is configured to format the data from the RAM into formatted data in response to a defined software transport protocol and to the instructions, and an auxiliary interface coupled to the memory buffer and to the remote computer system, wherein the auxiliary interface is configured to output the formatted data to the remote computer system, bypassing the host controller of the computer system.

These and other features, aspects, and advantages of the present invention will become better understood with reference to the following description and claims.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present memory system includes one or more memory buffers, each of which is arranged to buffer data and/or command instructions (e.g. bytes) being written to or read from random access memory (RAM chips) residing on a Dual In-line Memory Module (DIMM) by a host controller of a host computer system. In various embodiments, the RAM chips are referred to hereinafter as DRAM, though the invention is not limited to any specific memory chip type or technology.

In various embodiments, the memory buffer includes one or more additional hardware interfaces which are arranged to provide access to data stored in the DRAM chips, bypassing the host controller. In one example, the memory buffer might include a serial ATA (SATA) interface, or the like such that in addition to serving as a buffer between a host controller and the DRAM, the memory buffer also serves as a buffer between the host controller and/or DRAM and external devices capable of interfacing with a SATA interface.

Figure 1:
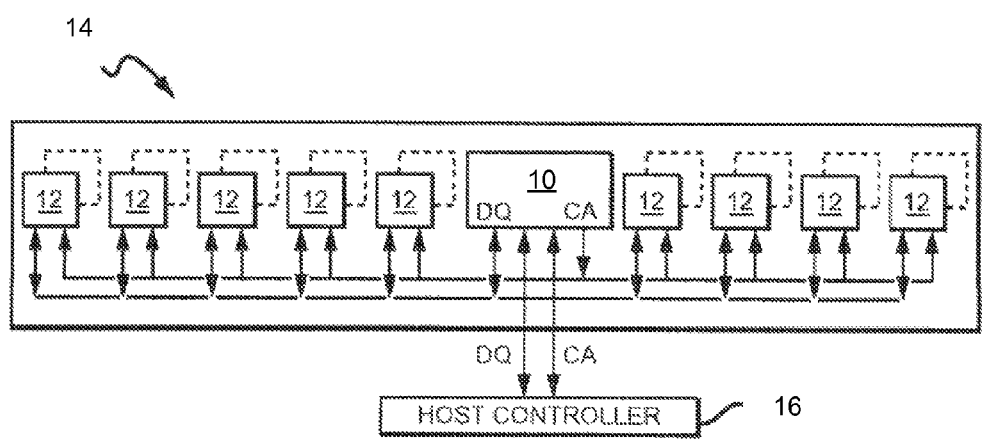
FIG. 1 is a block diagram of a known memory system which includes a DIMM containing a memory buffer.
Figure 2A:
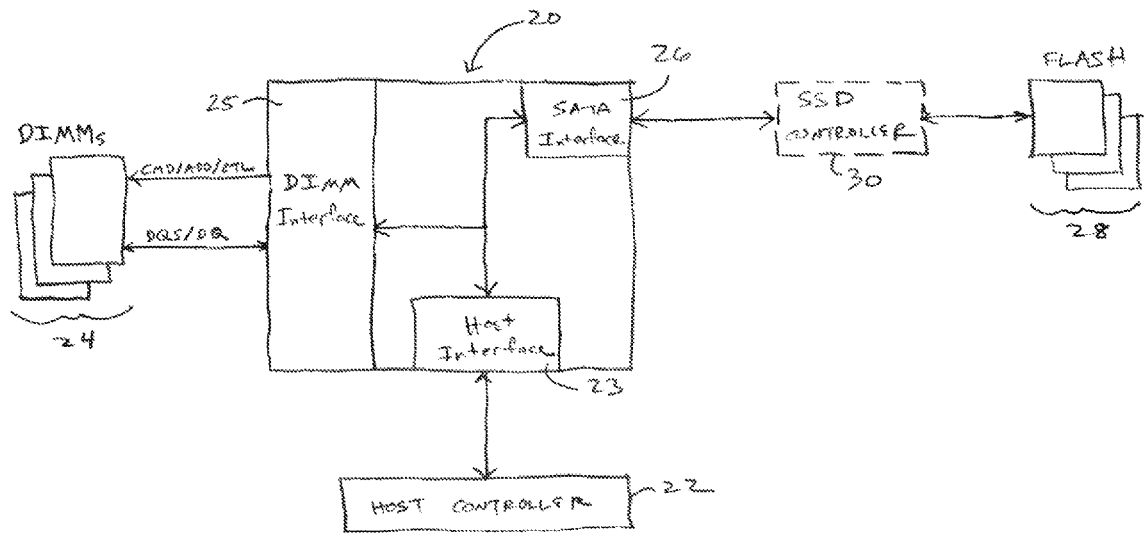
FIG. 2a is a block diagram of a memory system which includes a memory buffer in accordance with the present invention.

One possible embodiment of this concept is shown in FIG. 2A. In this embodiment, a memory buffer 20 interfaces with a host controller 22 (on a host computer system) via a host interface 23. In various embodiments, memory buffer 20 is coupled to DRAM residing on one or more DIMMs 24 via a DIMM interface 25 and operates as a buffer for command and data lines. Additionally, as illustrated, memory buffer 20 also includes an auxiliary interface 26 (e.g. SATA interface 26), In operation, memory buffer 20 also operates as a buffer between host controller 22 and/or any devices coupled to the auxiliary interface 26 (e.g. the SATA interface). For example, FLASH memory devices 28 might be connected to SATA interface 26 via a controller 30, such that data from host controller 22 or DIMM 24 can be written to the FLASH memory via SATA interface 26.

In other embodiments, the external devices may be connected directly to a memory buffer 20 via an auxiliary interface 26, or be coupled to them via intervening controller devices such as controller 30, as needed.

Various embodiments include memory systems having memory buffers 20 that control individual memory chips 24 and that interface between the individual memory chips 24 and a host controller 22. Various embodiments of the present invention may be adapted to standard memory interface specifications, such as DDR3, load-reduced DIMM (LRDIMM), registered or unregistered DIMM (RDIMM, UDIMM), non-volatile DIMM (NV-DIMM), or any DDR interface standard specifications.

In one specific example, a non volatile DIMM includes a memory buffer for reading and writing write RAM data to a FLASH memory. The FLASH memory maintains the data in the event of a power loss. In various embodiments, the NV-DIMM includes: a SATA interface (internal or external to the memory buffer); one or more a NV-DIMMs (per the arrangement shown in FIG. 2A); then, data stored in the DRAMs can be efficiently maintained in the FLASH memory if power is lost.

A SATA interface is merely one example of an interface that could be added to a memory buffer as described above. Other possible interfaces include an Ethernet interface, optical interface, and/or a radio interface, as well as interfaces capable of interfacing with additional known or future memory element types including, but not limited to, FLASH and DRAM.

In various embodiments, memory buffer 20 may be an integrated circuit that is separate and distinct from the DIMM ICs 24, as shown in FIG. 2a. In such embodiments, the DIMMs may be standard DIMMs—i.e., with no modifications.

Figure 2B:
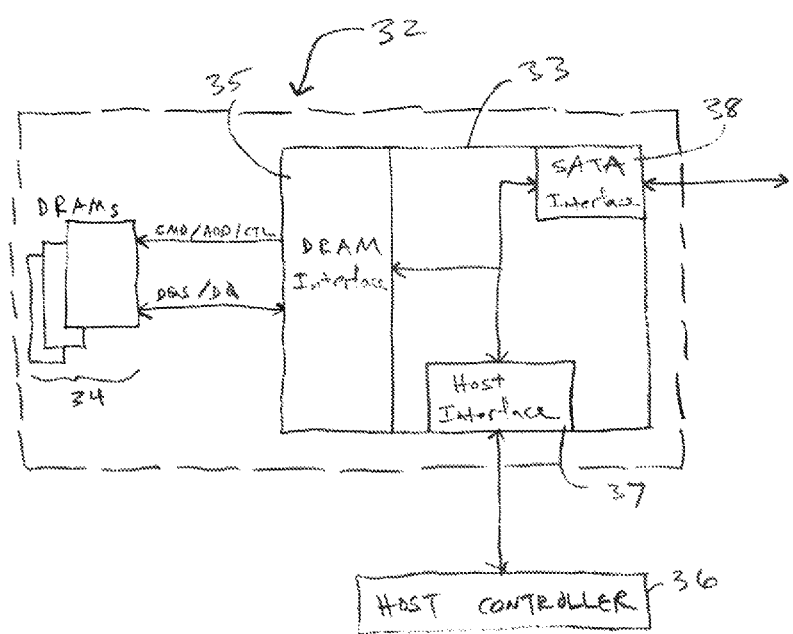
FIG. 2b is a block diagram of a memory system which includes a memory buffer in accordance with the present invention, in which the memory buffer resides on a DIMM.

In other embodiments, the memory buffer 33 may reside on the DIMM 32 containing the DRAM 34. This is illustrated in FIG. 2B where DIMM 32 includes a plurality of DRAM chips 34, and a memory buffer 33. In various embodiments, memory buffer 33 may include a DRAM interface 35 arranged to buffer data and/or command data (e.g. bytes) being written to or read from the DRAM 34 by a host controller 36 via a host interface 37. In some embodiments, memory buffer 33 includes at least one additional interface 38 arranged to buffer data and/or command bytes between host controller 36 and/or DRAM 34. In some embodiments, one or more external devices are coupled to DIMM 32 via interface 38, bypassing the data channel of the host controller 36. These external devices may include other DIMMS, network storage, FLASH memory, or the like.

In some embodiments, the form factor of DIMM 32 deviates from a standard form to accommodate the memory buffer, and/or additional interfaces 38. Because of the above additional functionality, DIMM 32 may require additional I/O connectivity between host interface 37 and host controller 36. In various embodiments, additional I/O pins are added to DIMM's 32 main connector, and in other embodiments, DIMMs 32 include one or more additional connectors in addition to DIMM's 32 main connector.

In some embodiments, the approach described herein is applicable to virtually any memory system that employs a memory buffer which serves as an interface between the individual memory chips on a DIMM and a host controller (as long as the system is capable of providing full control of the memory chips to the memory buffer).

In contrast to the above, previous memory systems that employed a memory buffer merely used the memory buffer as a 'slave' device. As a slave device, the memory buffer simply received commands from the host controller and then passed them to the DRAM interface. They did not control the DIMM interface of its own accord. In contrast, with embodiments of the present invention, the memory buffer typically has full control of the DRAM chips so that it can independently send and receive data between the DRAM and the additional interfaces (as well as performing general housekeeping and power management).

In various embodiments, read and write control can be given to memory buffer 33 in several ways or under several conditions. For example, the change of control can occur when power to the memory system 32 fails, is indeterminate, and/or is restored. As another example, full control of the DRAM 34 might also be given to the memory buffer 33 via direct or indirect commands from the host controller 36. In one example, a direct command may take the form of one or more special commands or signals sent by the host computer via host controller 36 to the memory buffer 33. In another example, an indirect command could may occur within a window of time when, when the host controller 36 is not going to access the DRAM 34 for a predetermined amount of time. Within this window, memory buffer 32 is thereby provided with control.

Figure 3:
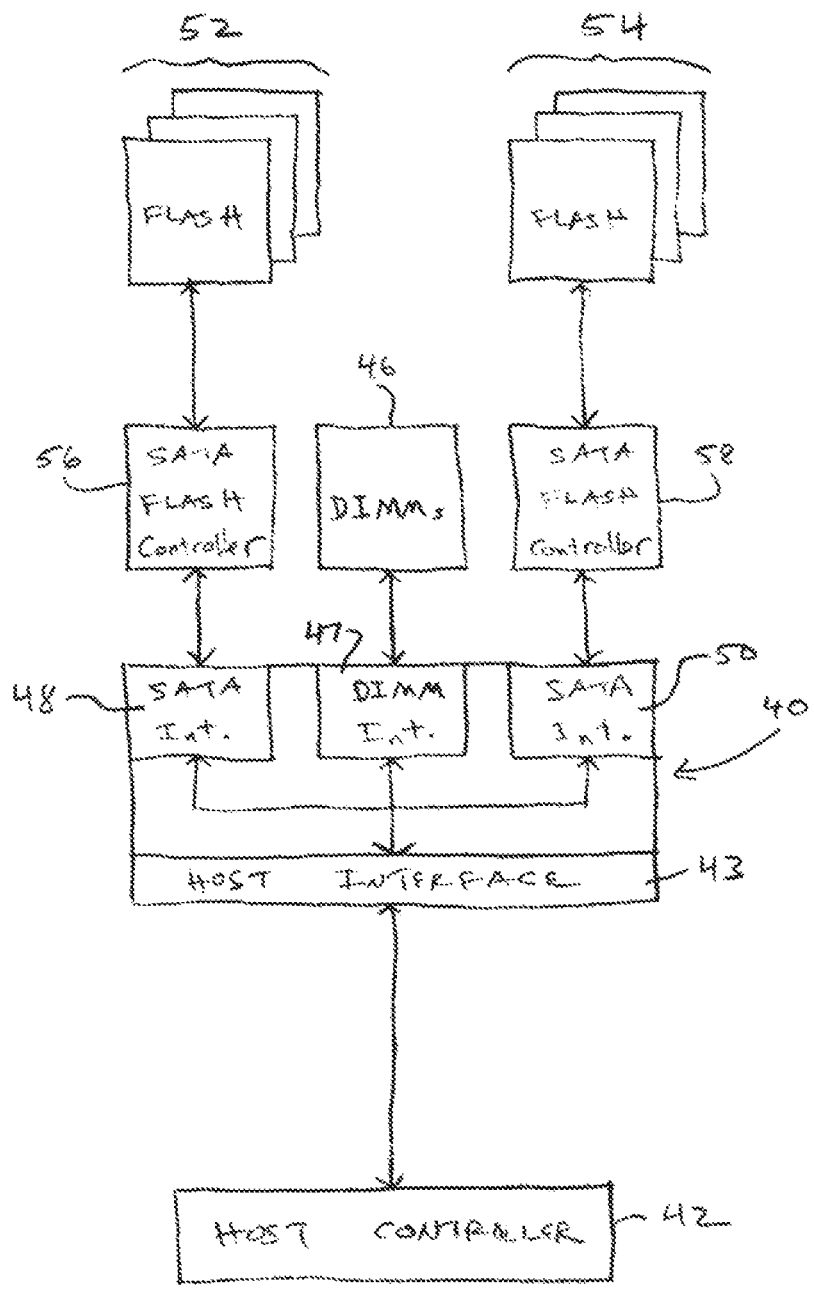
FIG. 3 is another possible embodiment of a memory system containing a memory buffer in accordance with the present invention.

Multiple interfaces 38 of the same type, or of different types, can be incorporated into a memory buffer 33 as needed. An exemplary embodiment illustrating the addition of two such interfaces is shown in FIG. 3. In this example, a memory buffer 40 provides a buffer for the command and data lines between a host controller 42 (via a host interface 43) and one or more DIMMs 46 (via a DIMM interface 47). As illustrated in FIG. 3, memory buffer 40 also includes two external interfaces 48, 50 (e.g. SATA) and operates as a buffer between host controller 42 and/or DIMMs 46 and external devices 52, 54. In the embodiment shown, the external devices 52 and 54 are FLASH memory devices and interface with SATA interfaces 48, 50 via one or more controllers 56, 58.

In various embodiments, the configuration illustrated in FIG. 3 may be implemented with a memory buffer 40 that is separate from DIMMs 46. In other embodiments, memory buffer 40 may be implemented on the DIMM containing DRAM.

Figure 4:
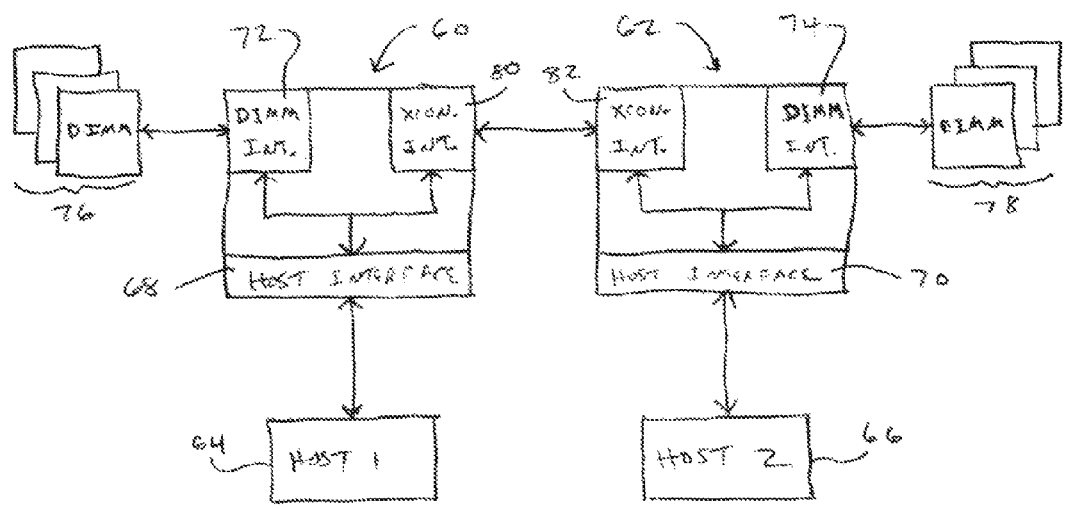
FIG. 4 is an embodiment of a memory system which includes two memory buffers in accordance with the present invention.

In some embodiments of the present invention, a memory system may include a memory buffer having an interface which enables two or more host controllers to be 'cross-connected. Such embodiments enable memory and/or data sharing between hosts, bypassing the host controller bus for data transfer. An exemplary embodiment is shown in FIG. 4. In the present example, memory buffers 60 and 62 interface with host controllers 64 and 66 via respective host interfaces 68, 70 (of respective host computer systems). As shown, each memory buffer 60, 62 also includes a DIMM interface 72, 74 that operates as a buffer for the command and data lines connected to DIMMs 76, 78. Additionally, memory buffer 60 includes a cross-connect interface 80, which is arranged to buffer data and/or command bytes between host controller 64 or DIMMs 76 and external devices. Similarly, memory buffer 62 includes a cross-connect interface 82, which is arranged to buffer data and/or command bytes between host controller 66 or DIMMs 78 and external devices. When cross-connect interfaces 80 and 82 are coupled together as shown, memory buffers 60 and 62 can operate as buffers between each other, as well as between host controllers 64 and 66, enabling data and/or command bytes to be exchanged between the DIMMs and/or host controllers via the cross-connect interfaces.

In various embodiments of the present invention, memory buffer 60 may format data from DIMMS 76 or from host 64 into a transport protocol, prior to output on cross-connect interface 80; and memory buffer 62 may unformat data received from cross-connect interface 82 from the transport protocol, prior to controller 66. The formatting may also be performed by memory buffer 62 and unformatting by memory buffer 60.

In various embodiments, the transport protocol may include the Ethernet protocol based upon frames of data. For example, in one embodiment, memory from DIMMs 76 or host controller 64 may be separated into a number of Ethernet frames. In one example, each frame may include, one or more of the following types of data, a preamble, start of frame (SOF) delimiters, a source and/or destination address, a frame length, the data, padding, a checksum, and the like. Other examples may also include other types of error correction mechanisms, such as Cyclic redundancy check (CRC); end of field indicators; framing protocols; interframe signals; and the like. In light of the present patent disclosure, one of ordinary skill in the art will recognize that many other types of data transfer mechanisms and formats may be used with embodiments of the present invention.

In various embodiments, a typical memory buffer will be able to both format and unformat data packets sent and received from another typical memory buffer. In other embodiments, one type of memory buffer may only format and transmit formatted data packets, and another type of memory buffer may only receive and unformat formatted data packets.

As with the other embodiments described herein, this sort of configuration can be implemented with memory buffers 60 and 62 being separate from DIMMs 76 and 78 as illustrated in FIG. 4. Alternatively, memory buffers 60 and 62 could be implemented onboard the DIMMs containing DRAM (e.g. DIMMs 76 and 78, respectively).

Figure 5:
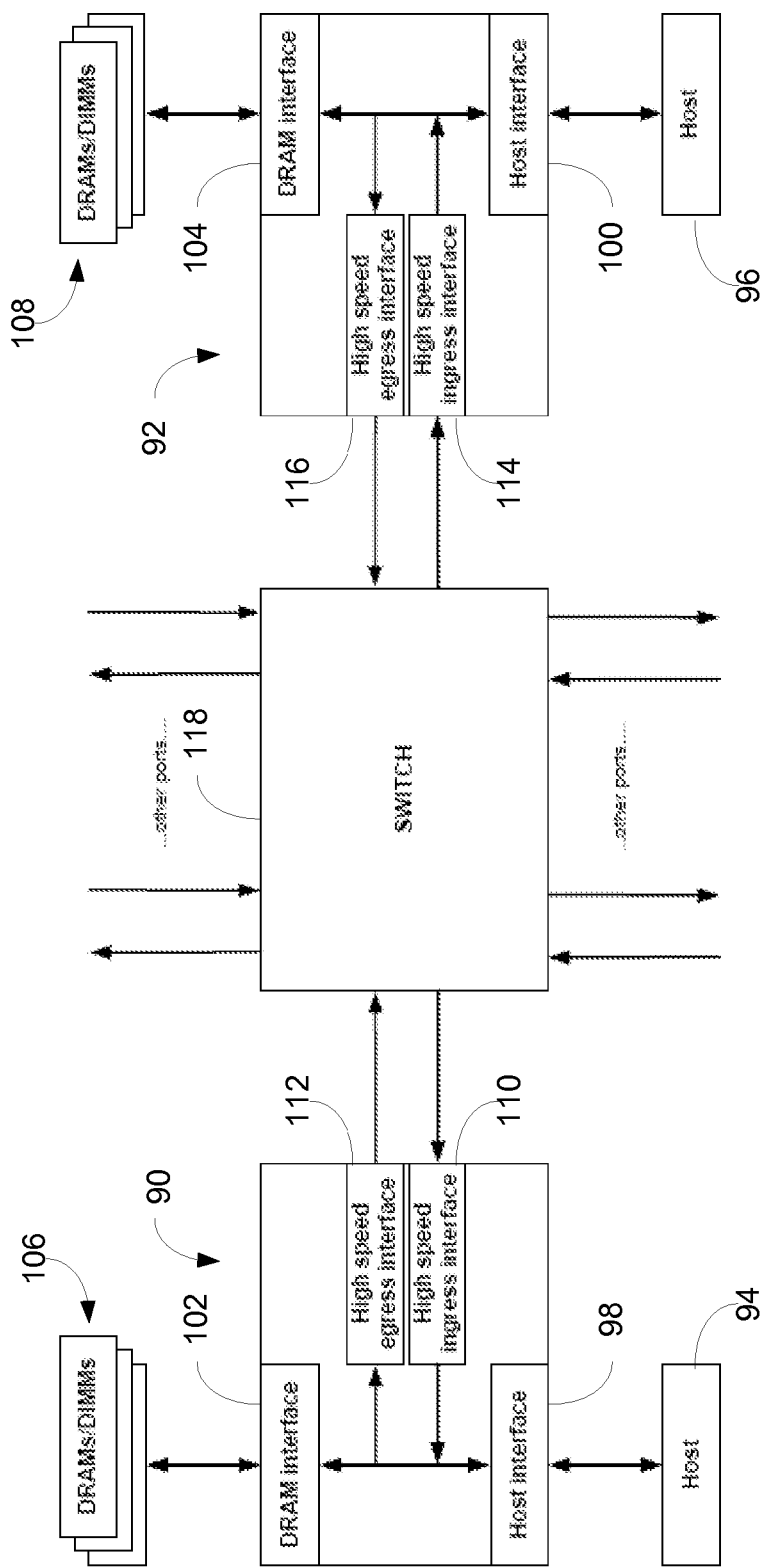
FIG. 5 is another possible embodiment of a memory system which includes memory buffers in accordance with the present invention.

Another possible embodiment is shown in FIG. 5, in which two or more memory buffers 90 and 92 enable two or more DIMMs 106 and 108 and/or two or more host controllers 94 and 96 to be 'cross-connected' via a switch. As illustrated in this example, memory buffers 90 and 92 interface with host computers (host controllers 94, 96) via respective host interfaces 98, 100.

In various embodiments, each memory buffer 90 and 92 also includes a DIMM interface 102, 104 which operates as a buffer for the command and data lines connected to one or more DIMMs 106, 108. Each memory buffer 90 and 92 also includes an ingress and an egress cross-connect interface (110 and 112 for memory buffer 90, 114 and 116 for memory buffer 92), which are connected to a switch 118. In various embodiments, the switch 118 can be arranged to enable unidirectional communication (in either direction), or bidirectional communication, between the respective cross-connect interfaces. Switch 118 thereby enables data and/or command bytes to be exchanged between the DIMMs 106, 108 and/or host controllers 94, 96 via the cross-connect interfaces 110, 112 and 114, 116.

In some embodiments of the present invention, switch 118 may include a series of data packet switches and/or multiplexers. In such examples, as described above, memory buffer 90 and/or 92 may format the data to be transferred as a series of formatted data packets, and unformat the series of data packets to recover the data. In one embodiment, switch 118 may be embodied as a packet switcher that receives each packet of formatted data, determines the destination address, and then routes each packet to the respective destination address.

In additional embodiments, switch 118 may include additional capability. For example, in some embodiments, switch 118 may include a memory that buffers or stores formatted packets. Such configurations enable switch 118 to provide flow control and quality of service functionality. For example, switch 118 may buffer formatted packets that are destined for memory buffer 92, if memory buffer 92 is busy storing data from host controller 96 to DIMMs 108. In operation, when memory buffer 92 is available, memory buffer 92 indicates to switch 118 that it can receive data, and in response, switch 118 can output formatted packets that have been buffered within switch 118.

In another example, switch 118 may buffer formatted packets that are destined for a third memory buffer while delivering formatted packets that are destined for a fourth memory buffer. In such cases, switch 118 may have quality of service (QoS) requirements that prioritize delivery of formatted data to the third memory buffer, accordingly delivery of formatted to the second memory buffer may be delayed, or the like. In light of the present patent disclosure, one of ordinary skill in the art will now recognize that many other types of QoS and flow control functionality may be implemented by embodiments of switch 118.

In another example, switch 118 may include the capability to analyze and/or reformat data packets. In some embodiments, switch 118 may analyze one or more portions of the packetized data, such as framing protocols, interframe signals, start of frame (SoF) delimiters, end of frame (EoF) delimiters, data length, or the like. In some embodiments, if such portions are incorrect, switch 118 may attempt to correct the packet and outputs a reformatted data packet. In other embodiments, switch 118 may also analyze one or more error detecting protocols, CRC protocols, or the like, to determine the validity of the data packet. In light of the present patent disclosure, one of ordinary skill in the art will now recognize that many other types of packet reformatting functionality may be implemented by embodiments of switch 118.

Figure 6:
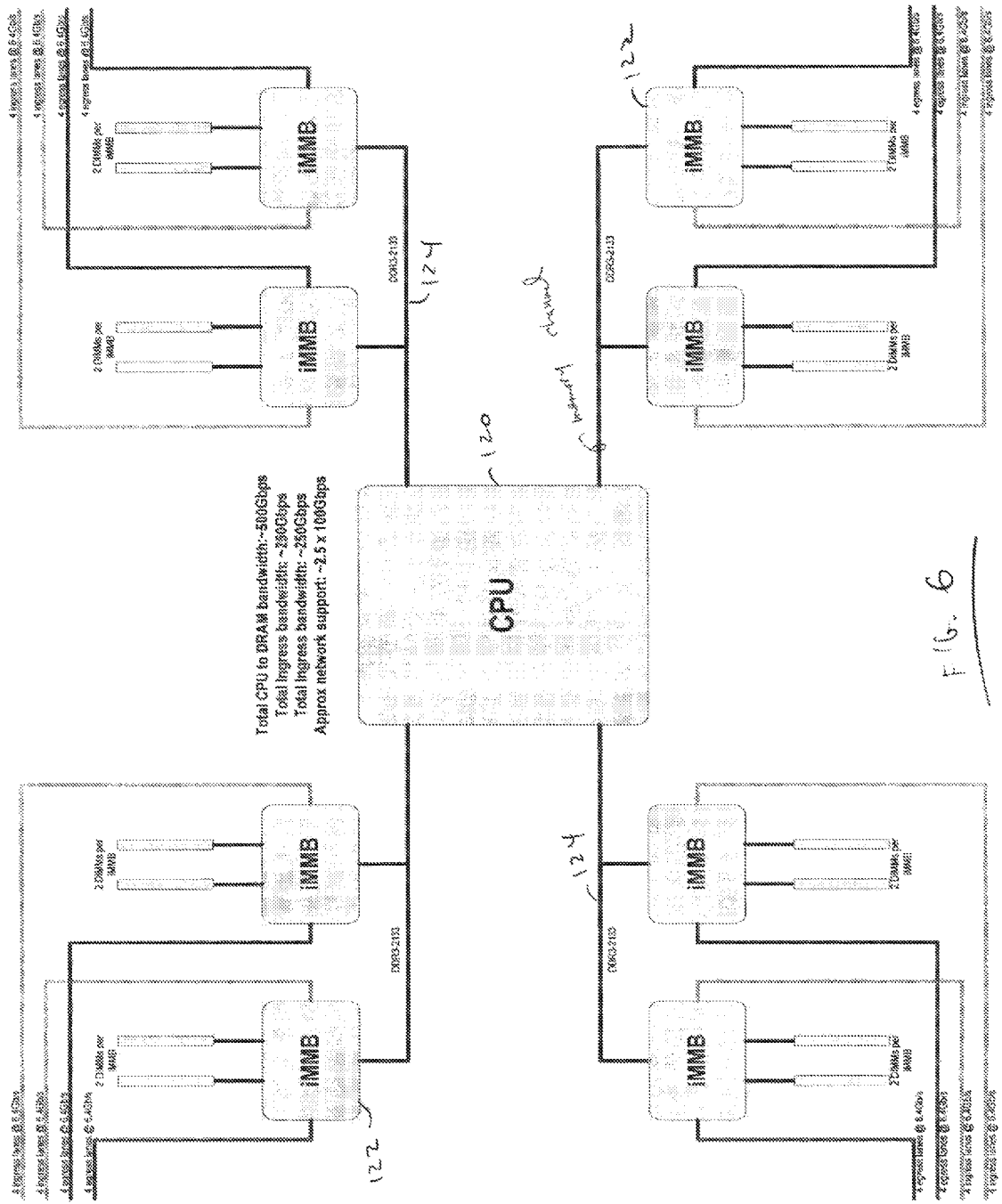
FIG. 6 is an embodiment of a memory system which includes a plurality of memory buffers in accordance with the present invention.

Another possible embodiment is shown in FIG. 6. In various embodiments, a common host (CPU 120) is connected to multiple memory buffer chips 122 via memory channels 124 (e.g. DDR3, DRAM memory interface); and each memory buffer chip 112 is in turn coupled to one or more DIMMs (2 DIMMs in the example shown in FIG. 6). In this example, each memory buffer 112 may be configured as described herein to include one or more additional or auxiliary interfaces. For example, each memory buffer 122 includes a separate ingress interface and an egress interface (illustrated in FIG. 5) or a cross connection interface (illustrated in FIG. 4). In some embodiments, these interfaces may be directly physically cross-connected to other interfaces, as desired or required, and in other embodiments, these interfaces may be cross-connected to other interfaces via one or more switches (as illustrated in FIG. 5).

In some embodiments, as described above, memory buffers 122 may include a direct memory access (DMA) controller capable of writing data to or reading data from the DIMMs. Additionally, memory buffers 112 may control and convey data between DIMMs, CPU 10, and one or more auxiliary interfaces, as described above. In one example, if a memory buffer 122 includes a SATA interface, the DMA controller may be arranged to exchange data between the DIMMs and the SATA interface.

In other embodiments of the present invention, memory buffers 122 may include a self-test engine capable of reading data from the DIMM and comparing it with one or more data patterns. One such memory buffer 122 may include, for example, a MemBIST (Memory Built-In Self Test) engine incorporated into an iMB memory buffer available from the present assignee of the present application, Inphi Corp. One function of this self-test engine may be to test the integrity of a DIMM's DRAM by reading data from it and comparing it against an expected pattern stored in the memory buffer.

In such an engine, an 'error' occurs if the data read does not match the expected pattern, and as a result, the offending DRAM address is logged and the test continues. In various embodiments, by changing a polarity of the error signal generated by the self-test engine, it is possible to change the operation performed by the self-test engine from 'test' to 'search'. Using this 'search' capability, when a pattern read from DRAM matches a pattern stored or inputted into the memory buffer 122, the DRAM address of the "found" data is logged and the search continues. In other embodiments, this search capability could be extended so that there are multiple possible match patterns, as well as "don't care" bits, which would enable searches to be executed for multiple patterns in parallel with wild cards.

In various embodiments, a memory buffer as described herein could be implemented as a single integrated circuit (IC), or with a multiple chip chipset with various functions spread among several ICs. For example, a memory system based on the DDR4 standard employs DIMMs which include nine separate data buffer chips arranged close to the connector contacts and provides an interface between the connector and the DRAMs. The standard also provides for a central control element which functions as the register section of the DIMM and includes an extra interface to control the data buffers. For this type of chipset implementation, implementing an auxiliary port as described herein requires a new path from the data buffers to the central controller.

The embodiments shown in the figures and described above are merely exemplary. The present system encompasses any memory system which employs a memory buffer that serves as an interface between the individual memory chips on a DIMM and a host, and which includes at least one additional, auxiliary interface which enables the memory buffer to serve as an interface between the host and/or memory chips and additional external devices.

In other embodiments, a system may include more than one host computer (each with host controller) wherein each host computer includes a memory buffer having a RAM interface and an auxiliary interface, as described herein. The auxiliary interfaces of the memory buffer of one host computer may be directly coupled to an auxiliary interface of the memory buffer of another host computer, or may be coupled via one or more switches. As described herein, such configurations enable the transfer of data from one RAM to another RAM bypassing data paths of the host controllers.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A computer-implemented method for transferring data from a computer system programmed to perform the method comprising:

receiving in a memory buffer in a first memory module hosted by the computer system, a request for data stored in RAM of the first memory module from a host controller of the computer system;

retrieving with the memory buffer, the data from the RAM, in response to the request;

formatting with the memory buffer, the data from the RAM into formatted data in response to a defined software transport protocol; and initiating with the memory buffer, transfer of the formatted data to a storage destination external to the first memory module via an auxiliary interface of the memory buffer, bypassing the host controller of the computer system;

wherein formatting with the memory buffer, the data from the RAM into formatted data comprises adding with the memory buffer, protocol data to the data from the RAM selected from a group consisting of: framing protocols, interframe signals, start of frame delimiters, error detecting protocols, CRC protocols;

receiving in another memory buffer in a second memory module hosted by another computer system, a request to store data in RAM of the second memory module from the host controller of the other computer system;

receiving via an auxiliary interface of the other memory buffer, the formatted data from the first memory module, bypassing the host controller of the other computer system;

deformatting with the other memory buffer, the formatted data into unformatted data in response to the request and to the defined software transport protocol; and storing with the memory buffer, the unformatted data into the RAM of the second memory module.

2. The method of claim 1 wherein
deformatting with the other memory buffer, the formatted data into unformatted data comprises removing with the other memory buffer, protocol data from the formatted data selected from a group consisting of: framing protocols, interframe signals, start of frame delimiters, error detecting protocols, CRC protocols.

3. The method of claim 1 further comprising:
receiving in a switch separate from the first memory module and the second memory module, the formatted data;
determining in the switch, routing information in response to the formatted data; and
initiating in the switch, transfer of the formatted data to the second memory module in response to the routing information.

4. The method of claim 3 further comprising:
storing in the switch, at least a portion of the formatted data.

5. The method of claim 3 further comprising:
determining in the switch, traffic data associated with the other computer system; and
wherein initiating transfer of the formatted data is also in response to the traffic data.

6. The method of claim 5 wherein the traffic data comprises a quality of service indicator.

7. A computer-implemented method for transferring data from a computer system programmed to perform the method comprising:
receiving in a memory buffer in a first memory module hosted by the computer system, a request for data stored in RAM of the first memory module from a host controller of the computer system;
retrieving with the memory buffer, the data from the RAM, in response to the request;
formatting with the memory buffer, the data from the RAM into formatted data in response to a defined software transport protocol; and
initiating with the memory buffer, transfer of the formatted data to a storage destination external to the first memory module via an auxiliary interface of the memory buffer, bypassing the host controller of the computer system;
receiving in a switch separate from the first memory module, the formatted data;
determining in the switch, routing information in response to the formatted data;
modifying in the switch, the formatted data to form modified formatted data; and
routing in the switch, the modified formatted data to a second memory module in response to the routing information.

8. The method of claim 7
wherein modifying the formatted data comprises modifying in the switch, protocol signals to form the modified formatted data;
wherein the protocol signals are selected from a group consisting of: framing protocols, interframe signals, start of frame delimiters, error detecting protocols, CRC protocols.

9. A computer system configured to transferring data to a remote computer system comprises:
a host controller configured to output instructions;
a processor coupled to the host controller, wherein the processor is configured to provide the instructions to the host controller;
a memory module coupled to the host controller, wherein the memory module includes:
RAM configured to store and provide data;
a memory buffer coupled to the RAM and to the host controller, wherein the memory buffer is configured to receive the instructions from the host controller, wherein the memory buffer is configured to retrieve the data from in the RAM in response to the instructions, and wherein the memory buffer is configured to format the data from the RAM into formatted data in response to a defined software transport protocol and to the instructions, and
an auxiliary interface coupled to the memory buffer and to the remote computer system, wherein the auxiliary interface is configured to output the formatted data to the remote computer system, bypassing the host controller of the computer system;
a remote computer system, wherein the remote computer system comprising:
a host controller configured to output receiving instructions;
a processor coupled to the host controller, wherein the processor is configured to provide the receiving instructions to the host controller;
a memory module coupled to the host controller, wherein the memory module includes:
an auxiliary interface coupled to the memory buffer and to the computer system, wherein the auxiliary interface is configured to receive the formatted data from the computer system, bypassing the host controller of the remote computer system;
RAM configured to store unformatted data; and
a memory buffer coupled to the RAM and to the host controller, wherein the memory buffer is configured to receive the receiving instructions from the host controller, wherein the memory buffer is configured to deformat the formatted data from the auxiliary interface into the unformatted data in response to the defined software transport protocol and to the receiving instructions, and wherein the memory buffer is configured to store the unformatted data into the RAM.

10. The computer system of claim 9 wherein
wherein the defined software transport protocol includes protocol data selected from a group consisting of: framing protocols, interframe signals, start of frame delimiters, error detecting protocols, CRC protocols.

11. The computer system of claim 10 further comprising:
a switch coupled to the computer system and to the remote computer system, wherein the switch is configured to receive the formatted data from the first computer system, wherein the switch is configured to determine routing information in response to the formatted data, and wherein the switch is configured to transfer the formatted data to the remote computer system in response to the routing information.

12. The computer system of claim 11 wherein the switch is configured to store at least a portion of the formatted data.

13. The computer system of claim 11
wherein the switch is configured to determine traffic data associated with the remote computer system, and wherein the switch is configured to initiate transfer of the formatted data to the remote computer system in response to the traffic data.

14. The computer system of claim 13 wherein the traffic data comprises a quality of service indicator.

15. A computer system configured to transferring data to a remote computer system comprises:
   a host controller configured to output instructions;
   a processor coupled to the host controller, wherein the processor is configured to provide the instructions to the host controller;
   a memory module coupled to the host controller, wherein the memory module includes:
      RAM configured to store and provide data;
      a memory buffer coupled to the RAM and to the host controller, wherein the memory buffer is configured to receive the instructions from the host controller, wherein the memory buffer is configured to retrieve the data from in the RAM in response to the instructions, and wherein the memory buffer is configured to format the data from the RAM into formatted data in response to a defined software transport protocol and to the instructions, and
   an auxiliary interface coupled to the memory buffer and to the remote computer system, wherein the auxiliary interface is configured to output the formatted data to the remote computer system, bypassing the host controller of the computer system;
   a switch coupled to the computer system and to the remote computer system, wherein the switch is configured to receive the formatted data from the first computer system, wherein the switch is configured to determine routing information in response to the formatted data, wherein the switch is configured to modify the formatted data into modified formatted data, and wherein the switch is configured to transfer the modified formatted data to the remote computer system in response to the routing information.

16. The computer system of claim 15
wherein the defined software transport protocol includes protocol data selected from a group consisting of: framing protocols, interframe signals, start of frame delimiters, error detecting protocols, CRC protocols.

17. The computer system of claim 15
wherein the switch is configured to modify protocol signals of the formatted data, wherein the protocol signals are selected from a group consisting of: framing protocols, interframe signals, start of frame delimiters, error detecting protocols, CRC protocols.

* * * * *